United States Patent
Chen et al.

(10) Patent No.: US 9,282,243 B2
(45) Date of Patent: Mar. 8, 2016

(54) EXPOSURE PARAMETER COMPENSATION METHOD AND AN IMAGING DEVICE

(75) Inventors: Tai-Hung Chen, Taipei (TW); Yi-Wen Tsai, Taipei (TW); Yijian Lee, Taipei (TW)

(73) Assignee: ABILITY ENTERPRISE CO., LTD., Taipei (TW)

( * ) Notice: Subject to any disclaimer, the term of this patent is extended or adjusted under 35 U.S.C. 154(b) by 682 days.

(21) Appl. No.: 13/221,486

(22) Filed: Aug. 30, 2011

(65) Prior Publication Data

US 2012/0206622 A1 Aug. 16, 2012

(30) Foreign Application Priority Data

Feb. 15, 2011 (TW) ............................. 100104877 A

(51) Int. Cl.
*H04N 5/235* (2006.01)
*H04N 5/232* (2006.01)

(52) U.S. Cl.
CPC ........... *H04N 5/23245* (2013.01); *H04N 5/235* (2013.01)

(58) Field of Classification Search
CPC .............. H04N 5/23245; H04N 5/235; H04N 2101/00; H04N 5/23248
USPC .................................... 348/229.1, 221.1, 296
See application file for complete search history.

(56) References Cited

U.S. PATENT DOCUMENTS

| | | | | |
|---|---|---|---|---|
| 7,440,022 B2* | 10/2008 | Matsumoto | .......... | H04N 5/2351 348/296 |
| 8,107,003 B2* | 1/2012 | Matsumoto | .......... | H04N 5/2351 348/296 |
| 8,154,621 B2* | 4/2012 | Tojo | .................. | H04N 5/23296 348/229.1 |
| 8,154,634 B2* | 4/2012 | Fukumoto | .......... | H04N 5/23232 348/252 |
| 8,345,120 B2* | 1/2013 | Takeuchi | ............... | H04N 5/235 348/229.1 |
| 8,483,452 B2* | 7/2013 | Ueda | ..................... | H04N 5/2355 348/208.12 |
| 8,704,940 B2* | 4/2014 | Aoki | ........................ | G02B 7/34 348/241 |
| 2003/0160875 A1* | 8/2003 | Mitsunaga | ............ | G06T 3/4015 348/222.1 |
| 2005/0231606 A1* | 10/2005 | Suzuki | ................... | H04N 5/235 348/222.1 |
| 2007/0025718 A1* | 2/2007 | Mori | ....................... | G03B 15/05 396/155 |
| 2008/0012969 A1* | 1/2008 | Kasai | ................... | H04N 5/23232 348/266 |
| 2008/0062284 A1* | 3/2008 | Fujio | ...................... | G03B 7/003 348/235 |
| 2008/0143841 A1* | 6/2008 | Tico | ..................... | H04N 5/23248 348/208.99 |
| 2009/0103630 A1* | 4/2009 | Fuchikami | ............. | H04N 5/772 375/240.25 |
| 2009/0231465 A1* | 9/2009 | Senba | ................. | H04N 5/23248 348/229.1 |
| 2010/0026823 A1* | 2/2010 | Sawada | .................... | G03B 7/28 348/222.1 |
| 2010/0053346 A1* | 3/2010 | Mitsunaga | ......... | H04N 5/23248 348/208.6 |
| 2010/0157139 A1* | 6/2010 | Velarde | .................. | H04N 9/735 348/366 |
| 2011/0122266 A1* | 5/2011 | Jang | .................... | H04N 5/23248 348/208.6 |

FOREIGN PATENT DOCUMENTS

| | | | |
|---|---|---|---|
| TW | 200505234 A | | 2/2005 |
| TW | 200745735 A | | 12/2007 |
| TW | 200917826 A | | 4/2009 |
| TW | 201041381 A | | 11/2010 |

* cited by examiner

*Primary Examiner* — Amy Hsu
(74) *Attorney, Agent, or Firm* — Rabin & Berdo, P.C.

(57) ABSTRACT

The present invention is directed to an exposure parameter compensation method and an imaging device. A capture-mode image capturing step is performed to obtain a first image and a second image according to a first exposure time and a second exposure time respectively based on a first light sensitivity and a predetermined time. The first image and the second image are operated on to result in a difference image. The first light sensitivity is replaced with a second light sensitivity, which is then recorded.

18 Claims, 4 Drawing Sheets

EXPOSURE PARAMETER COMPENSATION METHOD AND AN IMAGING DEVICE

BACKGROUND OF THE INVENTION

1. Field of the Invention

The present invention generally relates to an imaging device, and more particularly to an exposure parameter compensation method.

2. Description of Related Art

An image sensing element is one of important components of an imaging device, and is used to convert a light signal to an electric signal suitable to be post-processed by a processing unit. However, due to characteristic differences among the image sensing elements, the relationship between the light sensitivity in a preview mode and the light sensitivity in a capture mode generally cannot be maintained constant. Therefore, a need has arisen to calibrate the light sensitivity of preview mode and the light sensitivity of capture mode respectively.

An electronic shutter is ordinarily used to control exposure in the preview mode, and a mechanical shutter is ordinarily used to control exposure in the capture mode. The mechanical shutter has lower accuracy for the reason that a period of time, known as a lag time, is required from the beginning of shutting down the mechanical shutter until the mechanical shutter is completely shut down. As mechanical shutters are distinct from each other, a need has thus arisen to calibrate the mechanical shutter of each imaging device in order to ensure exposure accuracy.

The calibration procedure for a mechanical shutter should be based on accurate light sensitivity. On the other hand, however, the calibration procedure for light sensitivity should be based on an accurate lag time of the mechanical shutter. In other words, the mechanical shutter calibration and the light sensitivity calibration rely on each other to provide an accurate value as the calibration basis in order to arrive at an accurate calibration result. The conventional calibration procedure for light sensitivity uses a predetermined lag time of the mechanical shutter. As discussed above, the predetermined lag time is usually not consistent with a real mechanical shutter of the imaging device. Accordingly, an accurate result for the conventional light sensitivity calibration cannot normally be acquired.

For the foregoing reasons, a need has arisen to propose a novel light sensitivity calibration method used to alleviate the dilemma between the light sensitivity calibration and the mechanical shutter calibration.

SUMMARY OF THE INVENTION

In view of the foregoing, it is an object of the embodiment of the present invention to provide an exposure parameter compensation method and system in order to prevent the light sensitivity calibration from being affected by the lag time of the mechanical shutter, thereby obtaining an accurate light sensitivity calibration result.

According to an exposure parameter compensation method of the embodiment of the present invention, firstly, a capture-mode image capturing step is performed according to a first exposure time and a second exposure time respectively based on a first light sensitivity and a predetermined time, thereby obtaining a first image and a second image. Subsequently, an image operation is performed on the first image and the second image to result in a difference image. Finally, the first light sensitivity is replaced with a second light sensitivity, which is then recorded.

According to another embodiment, an imaging device includes an image sensing element, an electronic shutter, a mechanical shutter and an operating center. The image sensing element is configured to convert a light signal to an electric signal. The electronic shutter controls exposure of the image sensing element in the preview mode, and the mechanical shutter controls the exposure of the image sensing element in the capture mode, wherein the mechanical shutter has a lag time. The operating center is configured to perform light sensitivity calibration for the image sensing element. Specifically, the operating center performs a capture-mode image capturing step according to a first exposure time and a second exposure time respectively based on a first light sensitivity and a predetermined time, thereby obtaining a first image and a second image; performs an image operation on the first image and the second image to result in a difference image; and replacing the first light sensitivity with a second light sensitivity.

DETAILED DESCRIPTION OF THE INVENTION

Figure 1:
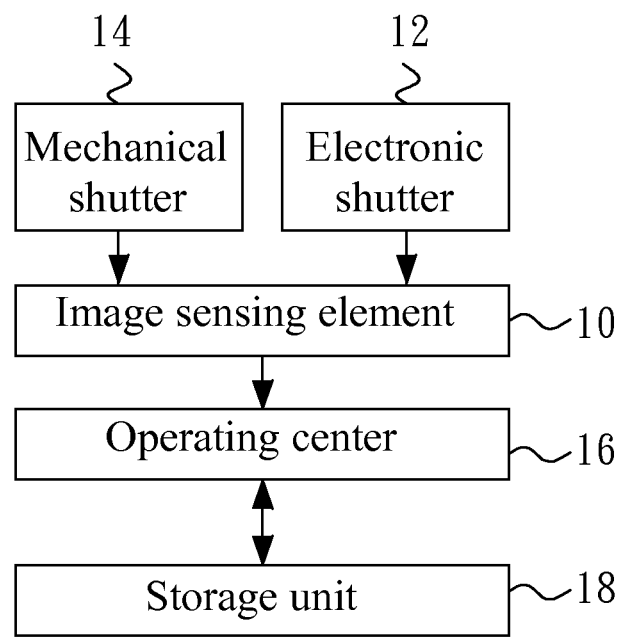
FIG. 1 shows a system block diagram of an imaging device according to one embodiment of the present invention.

FIG. 1 shows a system block diagram of an imaging device according to one embodiment of the present invention. The imaging device may be, but not limited to, a digital system with image capturing function, such as a digital video camera, a mobile phone, a personal digital assistant, a digital music player, a web camera or an image capturing and testing device.

Referring to FIG. 1, in the embodiment, the imaging device includes an image sensing element 10, an electronic shutter 12, a mechanical shutter 14, an operating center 16, and a storage unit 18. The image sensing element 10 is used to convert a light signal to an electric signal, and may be, but is not limited to, a charge coupled device or a complementary metal oxide semiconductor image sensor. The electronic shutter 12 may be used in a preview mode and a capture mode to control exposure time of the image sensing element 10, and the mechanical shutter 14 may be ordinarily used in the capture mode to control exposure time of the image sensing element 10. In the embodiment, in the capture mode, the mechanical shutter 14 is, but not necessarily, used to control exposure time of the image sensing element 10. Specifically, compared to the electronic shutter 12, as the mechanical shutter 14 is made of mechanical components, it requires a period of time, known as a lag time of the mechanical shutter 14, spanning from the beginning of shutting down the mechanical shutter 14 until the mechanical shutter 14 is completely shut down. Specifically speaking, during the lag time, as the mechanical shutter 14 has not been completely shut down, some light beams may be falling on the imaging device and may be received by the image sensing element 10.

Still referring to FIG. 1, the operating center 16 receives a capture-mode image in the capture mode or a preview-mode image in the preview mode, and performs light sensitivity calibration for the image sensing element 10. The operating center 16 may be, but is not limited to, a central processing unit, a digital signal processing unit, or a graphic processing unit; and the storage unit 18 is used to store initial parameters and resultant parameters of the operating center 16. The storage unit 18 may be built in the imaging device or may be a removable memory device such as, but not limited to, flash memory.

Figure 2A:
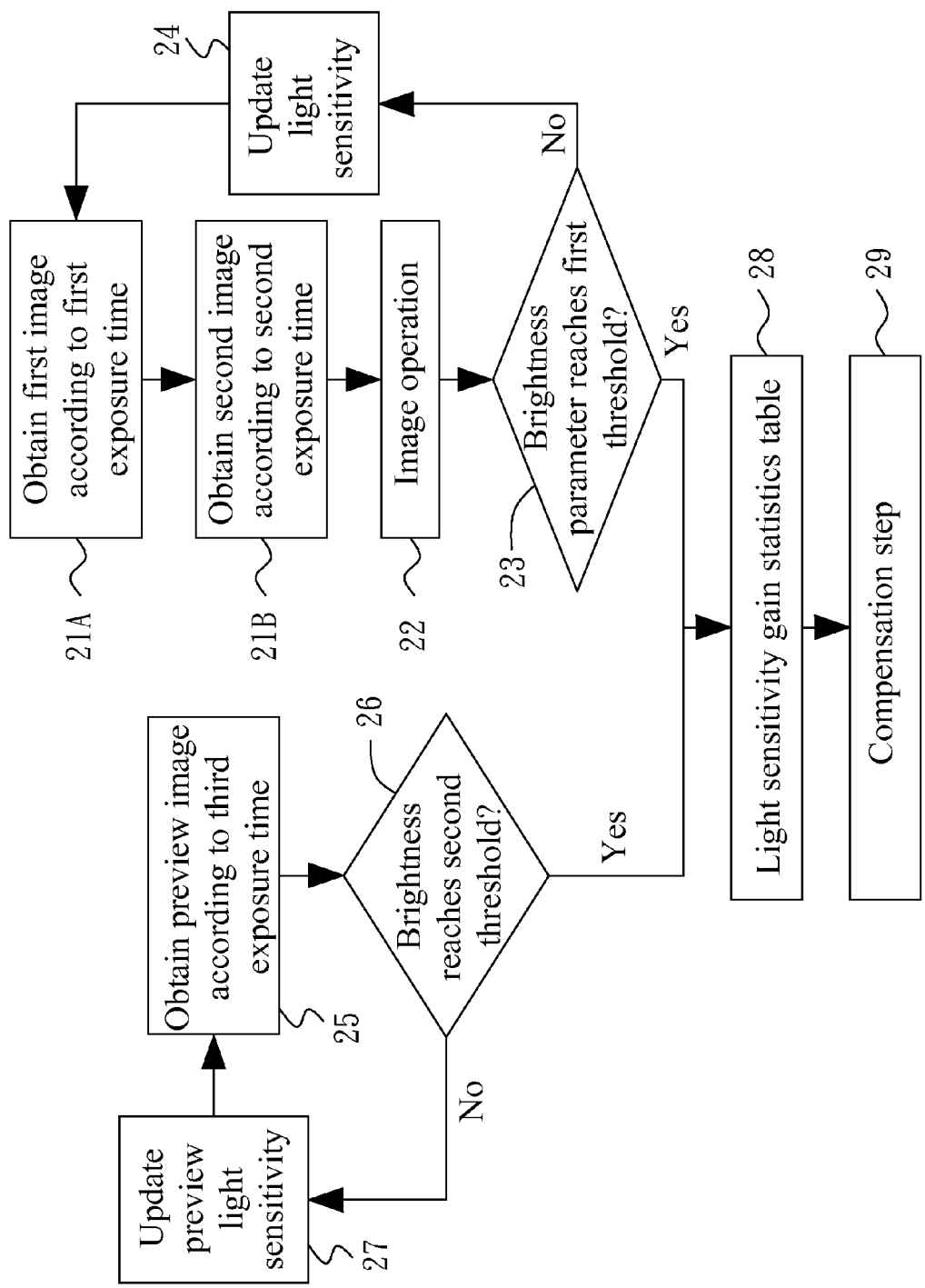
FIG. 2A shows a flow diagram of an exposure parameter compensation method according to one embodiment of the present invention.

FIG. 2A shows a flow diagram of an exposure parameter compensation method according to one embodiment of the present invention. The exposure parameter compensation method may be adapted to the imaging device illustrated in FIG. 1, or may be adapted to another system with an imaging function. Please refer to FIG. 1 and FIG. 2A while the exposure parameter compensation method is described. Firstly, in step 21A, the operating center 16 performs an image capturing step according to a first exposure time based on a first light sensitivity and a predetermined time, thereby obtaining a first image. In the embodiment, the predetermined time is the lag time of the mechanical shutter 14. Subsequently, in step 21B, the operating center 16 performs an image capturing step according to a second exposure time based on the first light sensitivity and the lag time of the mechanical shutter 14, thereby obtaining a second image. Step 21B may be performed before step 21A. In a practical manner, the second exposure time is different from the first exposure time; and, in the embodiment, the second exposure time is, but not necessarily, two times the first exposure time. Moreover, the first light sensitivity may be a built-in predetermined value or be an initial value input by a user.

Referring to FIG. 1 and FIG. 2A, in step 22, the operating center 16 operates the first image and the second image to obtain a difference image. In the embodiment, the operation is a subtraction on the first and second images. For example, the first image is subtracted from the second image to obtain the difference image with brightness difference with respect to each pixel. Subsequently, in step 23, it is determined whether the pixel brightness difference reaches a predetermined first threshold. If it is determined that the pixel brightness difference has not reached the predetermined first threshold, the flow proceeds to step 24, in which the first light sensitivity is replaced with a second light sensitivity to update the light sensitivity, and the second light sensitivity is recorded in the storage unit 18. Specifically, if the pixel brightness of the difference image is less than the predetermined first threshold, the light sensitivity is increased and is replaced with the second light sensitivity greater than the first light sensitivity. Similarly, if the pixel brightness of the difference image is greater than the predetermined first threshold, the light sensitivity is decreased and is replaced with the second light sensitivity less than the first light sensitivity. Moreover, the image capturing steps of steps 21A and 21B are repeatedly performed according to the first exposure time and the second exposure time respectively, until the pixel brightness difference of the difference image from step 22 reaches the first threshold.

Figure 3A:
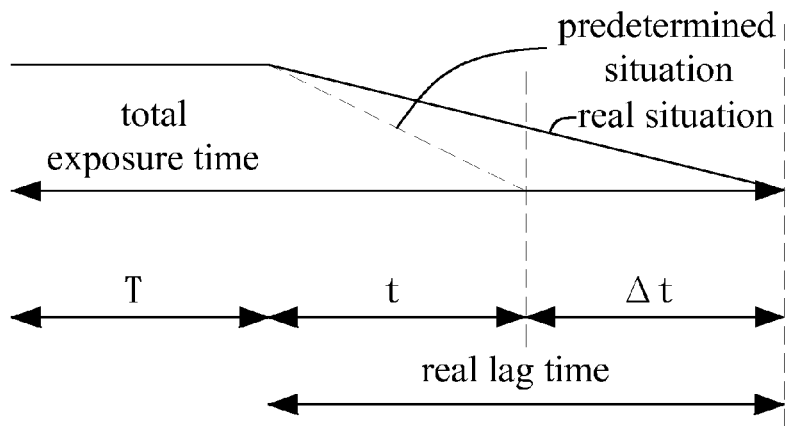
FIG. 3A, FIG. 3B and FIG. 3C show exemplary timing diagrams of the first image, the second image, and the difference image respectively.
Figure 3B:
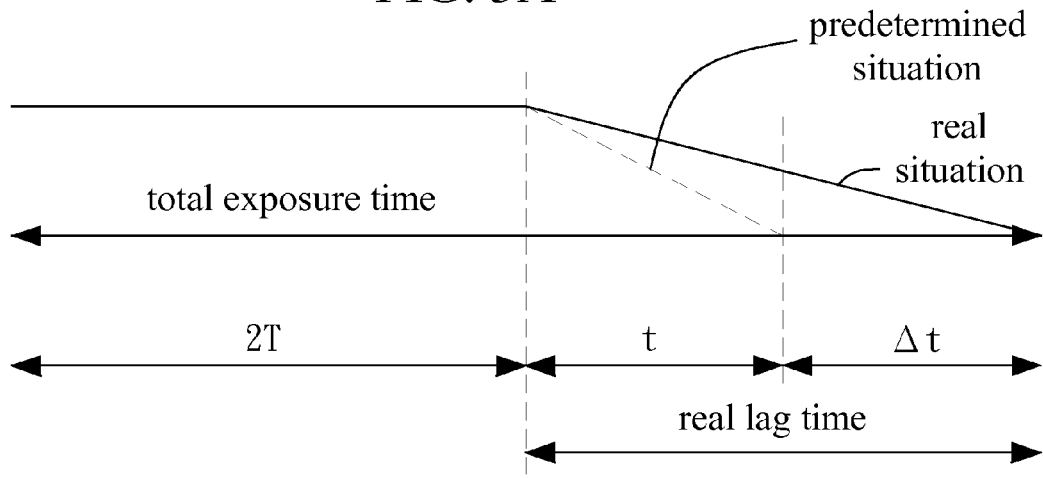

FIG. 3A and FIG. 3B show exemplary timing diagrams of the first image and the second image respectively, and FIG. 1 is also referred to. As shown in FIG. 3A, a total exposure time of the first image is the sum of the first exposure time T, the predetermined lag time of t the mechanical shutter 14, and a lag time deviation value Δt. A real lag time is the sum of the predetermined lag time t and the lag time deviation value Δt. FIG. 3A further shows a predetermined situation according to the predetermined lag time t of the mechanical shutter 14, and also shows a real situation according to both the predetermined lag time t and the lag time deviation value Δt of the mechanical shutter 14. As shown in FIG. 3B, a total exposure time of the second image is the sum of the second exposure time 2T, the predetermined lag time of t the mechanical shutter 14, and the lag time deviation value Δt. A real lag time is the sum of the predetermined lag time t and the lag time deviation value Δt. The predetermined lag time t and the lag time deviation time Δt are constant for the same mechanical shutter 14. The predetermined lag time t is an estimated initial value of the mechanical shutter 14, and the lag time deviation time Δt may be somewhat different with respect to different mechanical shutters 14. FIG. 3B further shows a predetermined situation according to the predetermined lag time t of the mechanical shutter 14, and also shows a real situation according to both the predetermined lag time t and the lag time deviation value Δt of the mechanical shutter 14.

Figure 3C:
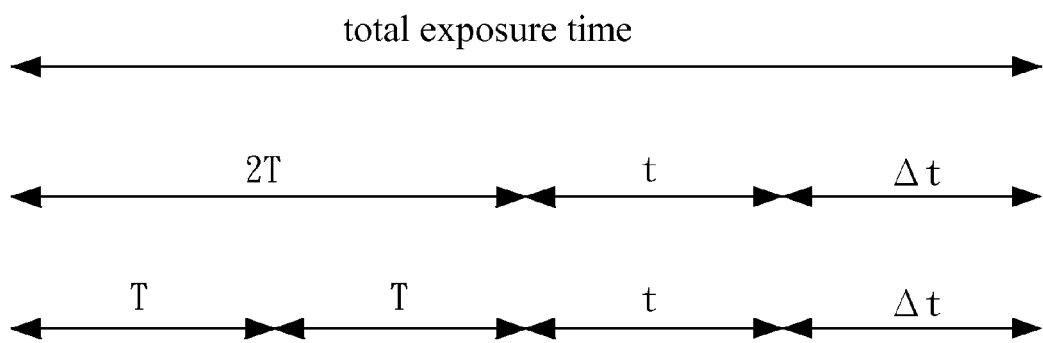

FIG. 3C shows an exemplary timing diagram of the difference image. Referring to FIG. 1 and FIG. 3C, as the same mechanical shutter 14 is used to perform two exposures to obtain the first image and the second image, where the first image is subtracted from the second image, and where the erroneous effect resulting from the predetermined lag time and the lag time deviation time of the mechanical shutter 14 can thus be cancelled.

Still referring to FIG. 1 and FIG. 2A, before or after steps 21A, 21B, 22, 23 and 24, the exposure parameter compensation method of the embodiment further includes the following preview-mode steps. In step 25, a preview step in the preview mode is performed according to a third light sensitivity and a third exposure time to obtain a preview image. In the preview step, the electronic shutter 12 is used to control the exposure of the image sensing element 10 to obtain the preview image. Subsequently, in step 26, it is determined whether the preview image reaches a predetermined second threshold. If it is determined that the preview image has not reached the predetermined second threshold, the flow proceeds to step 27, in which the third light sensitivity is replaced with a preview light sensitivity, and the preview step in step 25 is repeated according to the third exposure time, until the brightness of the preview image reaches the predetermined second threshold. Specifically, the third light sensitivity may be built-in predetermined value or an initial value inputted by the user. The first light sensitivity of the capture mode may be used as the third light sensitivity, or a subtraction result by subtracting a predetermined estimated difference value from the first light sensitivity may be used as the third light sensitivity.

Still referring to FIG. 1 and FIG. 2A, in the embodiment, the obtained second light sensitivity may correspond to a capture-mode light sensitivity gain value, and the obtained preview light sensitivity may correspond to a preview-mode light sensitivity gain value. Specifically, the lag time, the first light sensitivity, the second light sensitivity, the third light sensitivity, and the preview light sensitivity may be stored in the storage unit 18. When steps 23 and 26 are positively determined, the flow proceeds to step 28, in which the operating center 16 constructs a light sensitivity gain statistics table according to the capture-mode light sensitivity gain value and the preview-mode light sensitivity gain value, wherein the light sensitivity gain statistics table may be stored in the storage unit 18. Subsequently, in step 29, the operating center 16 performs a compensation step for the lag time in order to compensate for error resulted from shutting down the mechanical shutter 14.

Figure 2B:
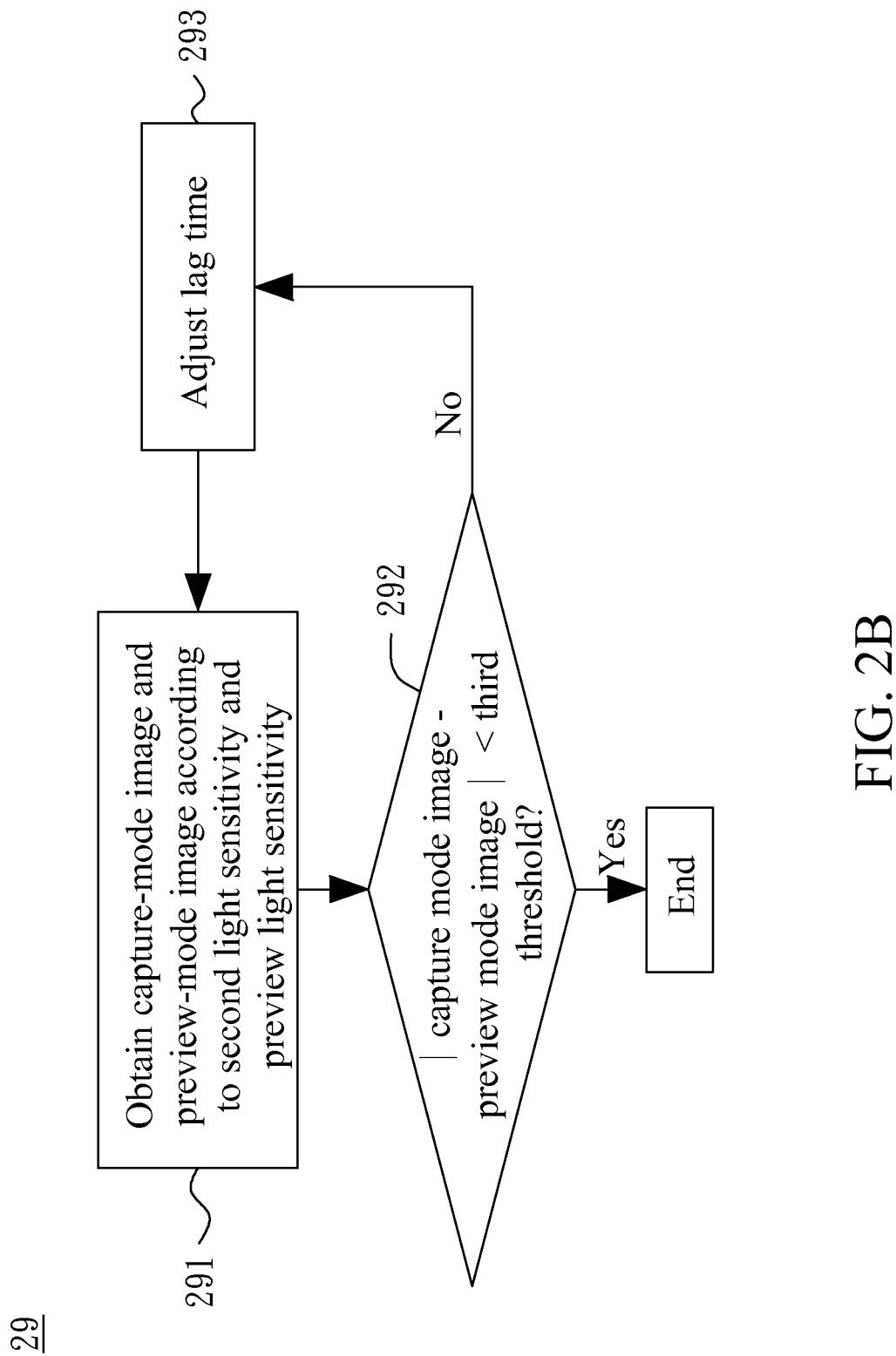
FIG. 2B shows a detailed flow diagram of the compensation step of FIG. 2A.

FIG. 2B shows a detailed flow diagram of the compensation step of FIG. 2A. Referring to FIG. 1 and FIG. 2B, in step 291, a capture-mode image and a preview-mode image are obtained according to the second light sensitivity and the preview light sensitivity respectively. Subsequently, in step 292, it is determined whether an absolute brightness difference value of the capture-mode image and the preview-mode image is less than a third threshold. If it is determined that the absolute brightness difference value is not less than the third threshold, the flow proceeds to step 293, in which the lag time of the mechanical shutter 14 is adjusted, and step 291 is repeated to obtain the capture-mode image and the preview-mode image, until it is determined in step 292 that the absolute brightness difference value is less than the third threshold.

Although specific embodiments have been illustrated and described, it will be appreciated by those skilled in the art that various modifications may be made without departing from the scope of the present invention, which is intended to be limited solely by the appended claims.

What is claimed is:

1. An exposure parameter compensation method, for an imaging device, comprising the steps of:
    performing, by an image sensing element of the imaging device, a capture-mode image capturing step in accordance with a first exposure time and a second exposure time respectively based on a first light sensitivity and a predetermined time, thereby obtaining a first image and a second image based on the same first light sensitivity and the same predetermined time;
    performing, by a processor of the imaging device, an image operation on the first image and the second image to result in a difference image;
    replacing, by the processor of the imaging device, the first light sensitivity with a second light sensitivity, which is then recorded; and
    repeating the image capturing step in accordance with the first exposure time and the second exposure time based on the second light sensitivity and the predetermined time, until a brightness parameter of the difference image reaches a first threshold.

2. The method of claim 1, further comprising the steps of;
    performing a preview step in the preview mode in accordance with a third light sensitivity and a third exposure time, thereby obtaining a preview image; and
    replacing the third light sensitivity with a preview sensitivity, and repeating the preview step according to the third exposure time until brightness of the preview image reaches a second threshold.

3. The method of claim 2, further comprising using an electronic shutter in the preview step to obtain the preview image.

4. The method of claim 2, further comprising the step of:
    performing a compensation step for the predetermined time to compensate for a deviation value of the predetermined time.

5. The method of claim 2, wherein the compensation step comprises:
    obtaining a capture-mode image in accordance with the second light sensitivity, and obtaining a preview-mode image in accordance with the preview light sensitivity; and
    adjusting the predetermined time, and repeatedly obtaining the capture-mode image and the preview-mode image until an absolute brightness difference value of the capture-mode image and the preview-mode image is less than a third threshold.

6. The method of claim 5, further comprising using an electronic shutter in the preview step to obtain the preview image.

7. The method of claim 2, wherein the second light sensitivity corresponds to a capture-mode light sensitivity gain value, and the preview light sensitivity corresponds to a preview-mode light sensitivity gain value.

8. The method of claim 7, further comprising the step of:
    constructing a light sensitivity gain statistics table in accordance with the capture-mode light sensitivity gain value and the preview-mode light sensitivity gain value.

9. The method of claim 1, wherein the second exposure time is two times the first exposure time.

10. The method of claim 1, in the capture-mode image capturing step, further comprising using a mechanical shutter to obtain the first image and the second image.

11. The method of claim 10, wherein the predetermined time is a predetermined lag time of the mechanical shutter.

12. An imaging device, comprising:
    an image sensing element converting a light signal to an electric signal;
    a shutter controlling exposure of the image sensing element in a preview mode or a capture mode; and
    an operating center performing light sensitivity calibration for the image sensing element;
    wherein the operating center
    performs a capture-mode image capturing step in accordance with a first exposure time and a second exposure time respectively, based on a first light sensitivity and a predetermined time and obtains a first image and a second image based on the same first light sensitivity and the same predetermined time,
    performs an image operation on the first image and the second image to result in a difference image,
    replaces the first light sensitivity with a second light sensitivity, and
    after replacing the first light sensitivity with the second light sensitivity, repeats the image capturing step in accordance with the first exposure time and the second exposure time based on the second light sensitivity and the predetermined time until a brightness parameter of the difference image reaches a first threshold.

13. The device of claim 12, wherein the operating center
    performs a preview step in the preview mode in accordance with a third light sensitivity and a third exposure time and obtains a preview image,
    replaces the third light sensitivity with a preview sensitivity, and
    repeats the preview step in accordance with the third exposure time until brightness of the preview image reaches a second threshold.

14. The device of claim 13, wherein the predetermined time is a predetermined lag time of the mechanical shutter, and wherein the operating center performs a compensation step for the predetermined time in accordance with the second light sensitivity and the preview light sensitivity.

15. The device of claim 14, wherein the compensation step comprises:
    obtaining a capture-mode image and a preview-mode image in accordance with the second light sensitivity and the preview light sensitivity respectively; and
    adjusting the predetermined time, and repeatedly obtaining the capture-mode image and the preview-mode image until an absolute brightness difference value of the capture-mode image and the preview-mode image is less than a third threshold.

16. The device of claim 13, wherein the second light sensitivity corresponds to a capture-mode light sensitivity gain value, and wherein the preview light sensitivity corresponds to a preview-mode light sensitivity gain value, and wherein the operating center constructs a light sensitivity gain statistics table in accordance with the capture-mode light sensitivity gain value and the preview-mode light sensitivity gain value.

17. The device of claim 16, further comprising:
a storage unit storing the predetermined lag time, the first light sensitivity, the second light sensitivity, the third light sensitivity, the preview light sensitivity, and the light sensitivity gain statistics table.

18. The device of claim 12, wherein the shutter comprises an electronic shutter or a mechanical shutter, and wherein the electronic shutter controls exposure of the image sensing element in the preview mode, and wherein the mechanical shutter controls exposure of the image sensing element in the capture mode.

* * * * *